(12) United States Patent
Miyahara et al.

(10) Patent No.: US 6,338,898 B1
(45) Date of Patent: Jan. 15, 2002

(54) HEAT-CONDUCTIVE RUBBER COMPOSITION MATERIAL AND HEAT-CONDUCTIVE RUBBER SHEET

(75) Inventors: Toshio Miyahara; Naoki Kimura; Jun Niekawa, all of Tokyo (JP)

(73) Assignee: Furakawa Electric Co., Inc. (JP)

( * ) Notice: Subject to any disclaimer, the term of this patent is extended or adjusted under 35 U.S.C. 154(b) by 0 days.

(21) Appl. No.: 09/597,037

(22) Filed: Jun. 20, 2000

Related U.S. Application Data

(62) Division of application No. 09/089,564, filed on Jun. 3, 1998, now Pat. No. 6,211,276.

(30) Foreign Application Priority Data

Jun. 4, 1997 (JP) ............................................. 9-146400
Jan. 20, 1998 (JP) ............................................. 10-8131

(51) Int. Cl.$^7$ ............................ B32B 5/16; C08K 3/22; C08K 9/00
(52) U.S. Cl. ...................... 428/328; 428/330; 428/343; 428/344; 524/433; 524/574; 524/925; 526/348
(58) Field of Search ................................ 524/433, 574, 524/925; 526/348; 428/328, 330, 343, 344

(56) References Cited

U.S. PATENT DOCUMENTS

| | | | |
|---|---|---|---|
| 4,572,868 A | * | 2/1986 | Hosaka ........................ 428/328 |
| 5,424,352 A | * | 6/1995 | Watanabe .................... 524/433 |
| 5,569,684 A | * | 10/1996 | Okami et al. ................ 523/209 |
| 6,057,395 A | * | 5/2000 | Nishimura ................... 524/433 |
| 6,211,276 B1 | * | 4/2001 | Miyahara et al. ............ 524/433 |

FOREIGN PATENT DOCUMENTS

| | | |
|---|---|---|
| JP | 57-100148 | 6/1982 |
| JP | Hei 6-171928 | 6/1994 |
| JP | Hei 7-292251 | 7/1995 |

* cited by examiner

*Primary Examiner*—Blaine Copenheaver
*Assistant Examiner*—Hai Vo
(74) *Attorney, Agent, or Firm*—Cantor Colburn LLP

(57) ABSTRACT

A heat-conductive rubber composition material, which comprises a rubber essentially consisting of an acrylic rubber, a butyl rubber, an ethylene propylene rubber or a blended rubber which comprises at least two of acrylic rubber, butyl rubber, and ethylene propylene rubber are blended, and 50 to 85 weight % of hydrophobic magnesium oxide powder, a heat-conductive rubber sheet prepared by forming the above thermal conductive rubber composition material, and a heat-conductive sheet, which comprises a soft metal sheet and a rubber layer formed on at least one surface of the soft metal sheet.

10 Claims, 2 Drawing Sheets

Table 1

| | | Sample of the invention No. | | | | | | | | Sample for comparison No. | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Rubber composition and weight portion thereof | TOAAKURON PS-200 | 100 | 100 | 100 | | | | 100 | 100 | 100 | 100 | | | |
| | TOAAKURON XH-2027D | 60 | 60 | 60 | | | | 60 | 60 | 60 | 60 | | | |
| | JSR 065 | | | | 100 | | | | | | | 100 | | |
| | EPT 4021 | | | | | 100 | 100 | | | | | | 100 | |
| | TETRAX 5T | | | | 30 | 30 | 30 | | | | | 30 | 30 | |
| | POLYBUTENE HV-100 | | | | 30 | 30 | 30 | | | | | 30 | 30 | |
| | BRIGHT STOCK | | | | 50 | 50 | 50 | | | | | 50 | 50 | |
| | D.O.P | 50 | 50 | 50 | | | | 50 | 50 | 50 | 50 | | | |
| | MICROWAX YH4D-1 | | | | | | | | 50 | | | | | |
| | EDOPURASU 70DS-NV | | 30 | 30 | 30 | | | | | 30 | 30 | 30 | | |
| | PARK MILL D | | | | | 3 | 3 | | | | | | 3 | |
| | TAIKU | | | | | 3 | 3 | | | | | | 3 | |
| | CORONATE L | | | | | | | 1 | 1 | | | | | |
| | SH-851U | | | | | | | | | | | | | 100 |
| | RC-4(50P) | | | | | | | | | | | | | 1 |
| Filler and weight portion thereof | PIROKISMA 5301 (Magnesiumoxide) | 500 | 500 | 750 | 750 | 750 | | | | 500 | 750 | 200 | 1500 | 300 |
| | PIROKISMA 5301K | | | | | | 650 | 650 | 650 | | | | | |
| | AL43PC (Aluminum oxide) | | | | | | | | | | | | | |
| Mixing rate of Filler (wt.%) | | 70.4 | 67.6 | 75.8 | 75.8 | 77.6 | 75.3 | 75.5 | 71.4 | 67.5 | 75.8 | 45.5 | 87.4 | 74.8 |

FIG. 1

Table 2

| | Sample of the invention No. | | | | | | | | | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| hardness | 40 | 40 | 65 | 60 | 72 | 68 | 62 | 58 | 50 | 77 | 38 | 94 | 84 |
| thermal conductivity (w/m.k) | 1.3 | 1.2 | 2 | 1.5 | 1.6 | 1.4 | 1.7 | 1.4 | 0.6 | 1.1 | 0.3 | 2.1 | 1.5 |
| adhesive rate (%) | 90 | 90 | 65 | 70 | 55 | 60 | 65 | 80 | 80 | 45 | 90 | 20 | 30 |
| effective thermal conductivity (w/m.k) | 1.17 | 1.08 | 1.3 | 1.05 | 0.88 | 0.84 | 1.11 | 1.12 | 0.48 | 0.5 | 0.27 | 0.42 | 0.45 |
| heat resistance (80°C) | O | O | O | O | O | O | O | O | O | O | O | O | O |
| heat resistance (120°C) | x | O | O | O | O | O | O | O | O | O | O | O | O |
| heat and wetting resistance (days) | 15 | — | — | — | — | 20 | >30 | >30 | — | — | — | — | — |

FIG. 2

HEAT-CONDUCTIVE RUBBER COMPOSITION MATERIAL AND HEAT-CONDUCTIVE RUBBER SHEET

CROSS REFERENCE TO RELATED APPLICATIONS

This application is a divisional application of U.S. Pat. No. 09/089,564 filed on Jun. 3, 1998, now U. S. Pat. No. 6,211,276 which is herein incorporated by reference in its entirety.

BACKGROUND OF THE INVENTION

The present invention relates to a heat conductive rubber composition material and a heat conductive rubber sheet which are used to secure a higher thermal connection between a heat sink for cooling and electric parts to be cooled which are arranged in various electronic and electric instruments.

RELATED ART

The cooling of the heat generating electronic parts such as semiconductor devices arranged in various electronic and electric instruments like computers has been considered as the important technical object to be attained. Conventional methods for cooling semiconductor devices and the like include a fan fixed to the housing of the electronic instrument, in which the semiconductors are arranged. The fan draws cooler air into the housing, which consequently removes heat from a heat sink fixed to the semiconductor devices. As the heat sink is cooled, so too will be the semiconductor.

Where a heat sink is fixed to the semiconductor devices or the like which device is intended to be cooled (hereinafter referred to as "part to be cooled"), the thermal connection between the part to be cooled and the heat sink is important. When the thermal connection is low between the part to be cooled and the heat sink, sufficient cooling cannot be obtained. For example, when the part to be cooled is placed in direct contact with the heat sink, the contact resistance in the interface therebetween is, in general, so large that the part to be cooled is not effectively cooled, thus failing to sufficiently cool the part to be cooled.

When the part to be cooled is soldered to the heat sink, the thermal resistance is remarkably lowered in comparison with the case in which the part to be cooled is directly contacted by the heat sink. However, even if the part to be cooled is soldered to the heat sink, when the difference in thermal expansion between the part to be cooled and the heat sink is large, the differing rates and magnitude of expansion can deleteriously affect the effectiveness of the heat sink. For example, where an aluminum sheet which is excellent in thermal conductivity, is applied to the material for the heat sink, they together have a large thermal expansion. The semiconductor device, on the other hand, as the part to be cooled, has a small thermal expansion. Thus, the generation of heat, stress is created in the soldered portion between the heat sink and the part to be cooled, causing a bending or peeling off of the soldered portion.

One prior art method to solve the above problem is to interpose grease, for example silicone grease or silicone rubber, between the part to be cooled and the heat sink. More specifically, when the grease or silicone rubber is interposed therebetween, it is expected that the grease or silicone rubber will absorb the difference in the thermal expansion between the part to be cooled and the heat sink so as to suppress the bending or peeling off. In addition, it is expected that the grease or silicone rubber will fill up small gaps existing between the parts to be cooled and the heat sink so as to lower the thermal resistance in the interface therebetween.

Since however, the grease or silicone rubber to be interposed between the part to be cooled and the heat sink has a higher thermal resistance in general, it is not easy to thermally connect the part to be cooled and the heat sink using this method. In addition, since the substance such as silicone grease has a remarkably lower thermal conductivity than the metal material forming the heat sink, it is not easy to further improve the cooling efficiency. Therefore, the art is in need of means for lowering the contact resistance between the part to be cooled and the cooling body while avoiding the above noted drawbacks.

Japanese Patent Publication No. 57-100148 discloses a method of interposing between the part to be cooled and the heat sink, a silicone rubber composite material which is prepared by mixing a filler such as aluminum oxide particles, aluminum nitride particles or boron nitride particles, which have relatively higher thermal conductivity, into a silicone rubber (hereinafter referred to as "rubber composition material").

The rubber composition material of the silicone rubber with the aluminum oxide particles, boron nitride or the like mixed therein has a higher thermal conductivity than the usual silicone rubber. When the thus prepared rubber composition material is interposed between the part to be cooled and the heat sink, it can be expected, to some degree, that the difference in thermal expansion therebetween is absorbed by the above rubber composition material. More specifically, it is expected that the bending or peeling off caused by the remarkable difference in the thermal expansion between the semiconductor and heat sink is to be prevented from occurring. In addition, errors in the size of the parts and errors in fabric are expected to be absorbed by the above rubber composition material.

In general, in order to improve the thermal conductivity of the above rubber composition material in which the aluminum oxide particles, boron nitride or the like as the filler are mixed into the silicone rubber, it is necessary to increase the amount of the filler. When the amount of the aluminum oxide particles, boron nitride or the like as the filler increases, however, the prepared rubber composition material becomes harder. Thus, the effect of absorbing the difference in thermal expansion between the part to be cooled and the heat sink, as well as the effect of absorbing the errors in the size of the parts and errors in fabric can not be expected.

Although the cost of aluminum oxide particles as the filler mixed into the silicone rubber is not expensive, making the method economically attractive, the prepared rubber composition material, as based above, has a tendency to become harder when the mixing amount thereof increases. Aluminum nitride particles or boron nitride particles are economically unfavorable for practical use due simply to a relatively high material cost. As is clear from the forgoing, the art is still in need of a method and composition capable of providing a high thermal connection between the part to be cooled and the heat sink in order to effectively cool the part to be cooled.

With electronic and electric instruments progressing to provide higher efficiency and smaller overall dimensions, the amount of heat and density of the areas over which it is radiated are increasing. In addition, the popular reduced dimension of electronic and electric instruments requires that the space used for heat sinks be narrowed. Therefore, it is desired to realize the means to obtain much higher thermal connection between the parts to be cooled and the heat sink in order to improve the efficiency of cooling so that an acceptable degree of cooling can be obtained by a smaller heat sink or that more cooling can be obtained for a longer heat sink.

SUMMARY OF THE INVENTION

The object of the present invention is therefore to provide a heat-conductive rubber composition material and a heat-conductive rubber sheet to realize a higher thermal connection between the parts to be cooled and the heat sink.

In order to attain the above object, there is provided a heat-conductive rubber composition material, which comprises a rubber essentially consisting of an acrylic rubber, a butyl rubber, an ethylene propylene rubber or a blended rubber in which at least two of said acrylic rubber, said butyl rubber, and said ethylene propylene rubber are blended, and 50 to 85 weight % of hydrophobic magnesium oxide particles.

Furthermore, there is also provided a heat-conductive rubber composition material, wherein said hydrophobic magnesium oxide particles comprise magnesium oxide particles obtained by burning at a temperature from 1100 to 1600 degrees C magnesium hydroxide having a high dispersion with an average article size of up to 2 $\mu$m, and having 1 to 20 m$^2$/g of BET specific surface area, then grinding the burned magnesium oxide to prepare magnesium oxide particles having an average secondary particle size of up to 20 $\mu$m.

Furthermore, there is also provided a heat-conductive rubber composition material, wherein said rubber comprises said acrylic rubber.

Furthermore, there is also provided a heat-conductive rubber composition material, which contains 1 to 10 weight % of magnesium silicate clay material containing water.

Furthermore, there is also provided a heat-conductive rubber composition material, which contains 2 to 20 weight % of organic compound having a melting point of 40 to 90 degrees C.

There is provided a heat-conductive rubber sheet prepared by forming the above heat-conductive rubber composition material to a sheet type.

Furthermore, there is also provided a heat-conductive rubber sheet prepared by coating the above heat-conductive rubber composition material onto both surfaces of a metal sheet.

Furthermore, there is also provided a heat-conductive rubber sheet, wherein an adhesive agent is further coated on at least one surface thereof.

There is provided a heat-conductive sheet, which comprises a soft metal sheet and a rubber layer formed on at least one surface of said soft metal sheet.

Furthermore, there is also provided a heat-conductive sheet, wherein said soft metal sheet comprises a material having tensile strength of up to 100 N/mm$^2$.

Furthermore, there is also provided a heat-conductive sheet, wherein said soft metal material comprises aluminum or copper.

Furthermore, there is also provided a heat-conductive sheet, wherein said soft metal material comprises pure aluminum having at least 99.99% of purity.

Furthermore, there is also provided a heat-conductive sheet, wherein said rubber layer comprises a rubber composition material comprising a mixture of a rubber essentially consisting of an acrylic rubber, a butyl rubber, an ethylene propylene rubber or a blended rubber blending at least two of said acrylic rubber, said butyl rubber, and said ethylene propylene rubber, and 50 to 85 weight % of hydrophobic magnesium oxide powder.

Furthermore, there is also provided a heat-conductive sheet, wherein said rubber composition material further contains 1 to 10 weight % of magnesium silicate clay material containing water.

Furthermore, there is also provided a heat-conductive sheet, wherein said rubber composition material further contains 2 to 20 weight % of organic compound having a melting point of 40 to 90 degrees C.

Furthermore, there is also provided a heat-conductive sheet, wherein an adhesive agent is coated on at least one surface of said rubber layer.

BRIEF DESCRIPTION OF THE FIGURES

FIGS. 1 and 2 are tabular results for examples of the invention.

DETAILED DESCRIPTION OF PREFERRED EMBODIMENTS

Since magnesium oxide particles in general have a high hydroscopicity, magnesium oxide particles absorb water from air under high humidity to change its quality. In the present invention hydrophobic magnesium oxide particles are applied as a filler to overcome the above problem. The hydrophobic magnesium oxide particles are the magnesium oxide particles obtained by burning at a temperature of from 1100 to 1600 degrees C, magnesium hydroxide having a high dispersion with an average particle size of up to 2 $\mu$m, and 1 to 20 m$^2$/g of BET specific surface area, and then grinding the burned magnesium oxide to prepare magnesium oxide particles having an average secondary particle size of up to 20 $\mu$m. As the above hydrophobic magnesium oxide particles, the magnesium oxide particles having high hydration resistance and high fluidity disclosed in Japanese Patent Publication No. 6-171,928 is available, the disclosure of which is incorporated herein by reference.

In general, the more the amount of the filler that is mixed into the rubber, the harder the rubber composition material becomes. Since magnesium oxide particles are softer than aluminum oxide particles, more magnesium oxide particles can be mixed into the rubber than the aluminum oxide particles where the same end hardness is obtained. Therefore more magnesium oxide particles may be mixed into the rubber thus increasing thermal conductivity when the hardness of the rubber composition material reaches the prescribed value. Therefore it is possible to suppress the hardness of the rubber composition material even if a large amount of magnesium oxide particles are mixed thereinto. Furthermore, since the hydrophobic magnesium oxide particle has higher thermal conductivity than the usual magnesium oxide particles, the thermal conductivity of the rubber composition material becomes higher when hydrophobic magnesium oxide particles are used.

Accordingly, when the hydrophobic magnesium oxide particles are applied, the thermal conductivity of the rubber composition material can be improved while maintaining the hardness thereof to a lower level.

The amount of the hydrophobic magnesium oxide particles mixed into the rubber is limited to within a range of 50 to 85 weight % of the rubber composition material in view of the thermal conductivity and the hardness of the rubber composition material. With the hydrophobic magnesium oxide particles under 50 weight %, the thermal conductivity of the rubber composition material is low. With the hydrophobic magnesium oxide particles over 85 weight %, the rubber composition material becomes too hard, thus lowering adhesiveness between the parts to be cooled and the heat sink.

In the present invention, a rubber should essentially consist of an acrylic rubber (a synthetic rubber consisting essentially of acrylic ester), a butyl rubber, an ethylene propylene rubber or a blended rubber in which at least two of the acrylic rubber, butyl rubber, and ethylene propylene rubber are blended. More specifically, the rubber of the present invention is not silicone rubber. In the rubber composition material of the present invention, 1 to 10 weight % of magnesium silicate clay material containing water may be further contained. With the above amount of magnesium silicate clay material containing water further contained, the heat resistance of the rubber composition material can be improved. With the magnesium silicate clay material containing water under 1 weight %, the above effect cannot be expected. With the magnesium silicate clay material containing water over 10 weight %, the above effect is not improved any more, and furthermore, the thermal conductivity of the rubber composition material is lowered and the hardness thereof increases. The preferable amount of the magnesium silicate clay material containing water is within a range of 3 to 7 weight %.

In the rubber composition material of the present invention, 2 to 20 weight % of organic compound having a melting point of 40 to 90 degrees C may be further contained. With the above amount of organic compound further contained, the organic compound is softened by the heat of the parts to be cooled so as to fill the surface irregularities in the interface between the parts to be cooled and the rubber composition material (sheet type). As a result, the thermal connection between the parts to be cooled and the rubber composition may be further improved, thus realizing a more efficient cooling effect. As the organic compound having a melting point of 40 to 90 degrees C, a slipping agent such as paraffin wax, microcrystalline wax or the like, an adhesive agent such as macron resin, polyterpene resin or the like, and the other low molecular weight resin or the like may be applied. With the organic compound under 2 weight %, the above effect cannot be expected. With the organic compound over 20 weight %, the amount of the softened organic compound increases, thus lowering the heat resistance.

The heat-conductive rubber sheet prepared by forming the above-mentioned heat-conductive rubber composition material to a sheet type is suitably applied for being interposed between the parts to be cooled and the heat sink. The heat-conductive rubber sheet prepared by coating the above-mentioned heat-conductive rubber composition material onto both surfaces of a metal sheet is particularly excellent in thermal conductivity along the surface thereof (i.e., surface direction), thus leveling the temperature of the parts to be cooled. In addition, since the intermediate portion of the heat-conductive rubber sheet comprises a metal sheet, the strength of the sheet increases. More specifically, when the heat-conductive rubber sheet is interposed at the required position, the sheet is hardly broken, or wrinkled.

When an adhesive agent is coated on the surface of the heat-conductive rubber sheet, the connection of the heat-conductive rubber sheet with the electric parts or the heat sink is further improved, thus realizing excellent cooling efficiency. In addition, the working to connect the rubber sheet therewith becomes easier.

The heat-conductive sheet of the present invention is interposed between the heat sink and the parts to be cooled to improve the thermal connection therebetween. The interposed heat-conductive sheet remarkably lowers the contact resistance therebetween in comparison with the case in which the heat sink is directly contacted with the parts to be cooled.

Furthermore, when the heat-conductive sheet of the present invention is applied, it is possible to connect the heat sink with the parts to be cooled without soldering the heat sink to the parts to be cooled, while still obtaining the benefit that the contact resistance is lowered. Thus, the problem, which is caused by the large difference in the thermal expansion between the heat sink and the parts to be cooled when being soldered, is effectively prevented from occurring. More specifically, the problem of the bending or the like caused by the large difference in the thermal expansion between the heat sink and the parts to be cooled can be overcome.

The heat-conductive sheet of the present invention comprises a soft metal sheet and a rubber layer formed on one surface or both surfaces of the soft metal sheet, which has high flexibility. The above heat-conductive sheet has high strength not to be torn in comparison with the rubber per se or the rubber composition material formed to a sheet type. When the heat-conductive sheet of the present invention is disposed at the required position, the heat-conductive sheet is hardly broken, or wrinkled. Thus, the working to interpose the heat-conductive sheet between the heat sink and the parts-to be cooled becomes easier.

Since the soft metal sheet is soft enough, when the heat-conductive sheet of the present invention is interposed between the heat sink and the parts to be cooled, the rough surfaces of the heat sink and the parts to be cooled are effectively filled by the soft metal sheet, thus realizing a high thermal connection between the heat sink and the parts to be cooled so as to lead to the highly efficient cooling of the parts to be cooled.

In the present invention, the material of the soft metal sheet is not particularly limited, however, it is effective to use the material having a tensile strength of up to 100 $N/mm^2$ as the soft metal. For example, soft metal such as aluminum or copper is practically applied. When an aluminum material is applied, the aluminum material having at least 99.99% of purity is preferable.

In the present invention, the rubber layer comprises the rubber composition material which comprises a mixture of a rubber essentially consisting of an acrylic rubber, a butyl rubber, an ethylene propylene rubber or a blended rubber in which at least two of the acrylic rubber, butyl rubber and ethylene propylene rubber are blended, and 50 to 85 weight % of hydrophobic magnesium oxide particles.

The above-mentioned rubber composition material which is applied in the rubber layer is preferably the same rubber composition material as the previously described heat-conductive rubber composition material.

In the rubber composition material which is applied in the rubber layer, 1 to 10 (preferably 3 to 7) weight % of magnesium silicate clay material containing water may be further contained. The effect thereof is the same as previously described in relation with the rubber composition material.

In the rubber composition material which is applied in the rubber layer, 2 to 20 weight % of organic compound having a melting point of 40 to 90 degrees C may be further contained. The effect thereof is the same as previously described in relation with the rubber composition material. As the organic compound having a melting point of 40 to 90 degrees C, a slipping agent such as paraffin wax, microcrystalline wax or the like, an adhesive agent such as macron resin, polyterpene resin or the like, and the other low molecular weight resin or the like may be applied.

The contacting surface (i.e., interface) of the parts to be cooled and the heat-conductive sheet is preferably flat. However, the parts to be cooled have various kinds of surface features. According to the heat-conductive sheet of the present invention, even if the surface of the parts to be cooled has many small rough portions, the soft metal of the heat-conductive sheet of the present invention effectively fill the rough portions, thus realizing a high thermal connection between the heat-conductive sheet and the parts to be cooled.

EXAMPLE

Example 1

The rubber and the filler are mixed to prepare rubber composition material as shown in Table 1. The respective amount of the filler in weight % is also shown in Table 1. The rubbers and the fillers shown in Table 1 are the following product names:

[Rubber material]

TOAAKURON PS-220: acrylic rubber manufactured by Toupe Co. Ltd.
TOAAKURON XH-2027 D: low molecular weight acrylic rubber manufactured by Toupe Co. Ltd.
JSR065: butyl rubber manufactured by Nippon Gosei Gom Co. Ltd.
EPT4021: ethylene propylene rubber manufactured by Mitsui Sekiyu Kagaku Kogyo Co. Ltd.
TETRAX 5T: polyisobutylene manufactured by Nippon Sekiyu Kagaku Co. Ltd.
POLYBUTENE HV-100: polybutene manufactured by Nippon Sekiyu Kagaku Co. Ltd.
BRIGHT STOCK: polybutene (softening agent) manufactured by Nippon Sekiyu Kagaku Co. Ltd.
D.O.P: pasticizer manufactured by Kyowa Hakkou Co.Ltd.
MICRO WAX YH4D-1: slipping agent manufactured by Nippon Sekiyu Kagaku Co. Ltd.
EDOPURASU 70DS-NV: magnesium silicate clay material containing water manufactured by Mizusawa Kagaku Kogyo Co. Ltd.
SH-851U: silicone rubber manufactured by Tore EDauconing Esilicone Co. Ltd.
RC-4(50P): peroxide bridging agent manufactured by Tore EDauconing Esilicone Co. Ltd.
PARKMILL D: peroxide bridging agent manufactured by Nippon Yushi Co. Ltd.
TAIKU: bridging assist agent manufactured by Nippon Kasei Co. Ltd.
CORONATE L: bridging agent manufactured by Nippon polyurethane Kogyo Co. Ltd.

[Filler material]

PIROKISMA 5301: magnesium oxide particles (average particle size of 2 μm) having hydration resistance manufactured by Kyowa Kagaku Kogyo Co. Ltd.
PIROKISMA 5301K: magnesium oxide particles (average particle size of 2 μm) having high hydration resistance manufactured by Kyowa Kagaku Kogyo Co. Ltd.
AL43PC: aluminum particles (average particle size of 4.6 μm) manufactured by Showa Denko Co. Ltd.

[Sample of the invention No. 1 to 4 and Sample for comparison No. 1 to 3 ]

The rubber and filler shown in Table 1 are kneaded by a kneader, and the kneaded material is formed to a sheet by an open roll, and then a heating press is applied to the sheet at the temperature of 150 degrees C for 10 minutes to prepare heat-conductive rubber sheets having a thickness of 20 mm.

The thermal conductivity of the prepared respective heat-conductive rubber sheet was investigated. The results are shown in Table 2. The thermal conductivity was measured by QTM thermal conductivity quick tester manufactured by Kyoto Denshi Kogyo Co. Ltd. The hardness was measured by ASKER-C type hardness meter manufactured by Kobunshi Keiki Co. Ltd.

In addition, the rubber and filler shown in Table 1 are kneaded by a kneader, and the kneaded material is formed to a sheet by an open roll, and then a heating press is applied to the sheet by a heat press at the temperature of 150 degrees C for 10 minutes to prepare heat-conductive rubber sheets having a thickness of 0.2 mm.

Thus prepared respective heat-conductive rubber sheet is interposed between two transparent acrylic sheets having 5 mm (thickness)×30 mm (width)×30 mm (length). Then the four corners thereof were pressed and held by a screw at 0.5 N·m torque, and then, the portion in which the heat-conductive rubber sheet is adhered to the acrylic sheet (hereinafter referred to as "adhesive rate") were investigated by eye. The results are also shown in Table 2.

Furthermore, the rubber and filler shown in Table 1 are kneaded by a kneader, and the kneaded material is formed to a sheet by an open roll, and then a heating press is applied to the sheet by a heat press at the temperature of 150 degrees C for 10 minutes to prepare heat-conductive rubber sheets having 1 mm (thickness)×25 mm (width)×50 mm (length).

The heat resistance of the prepared respective heat-conductive rubber sheet was investigated in the following manner. Each of the heat-conductive rubber sheets was placed in the respective oven at the temperatures of 80 degrees C, 120 degrees C for 96 hours. Then, it was investigated by eye whether the heat-conductive rubber sheet was fractured. The results were also shown in Table 2, in which ○ shows that no fracture is observed and X shows fracture is observed. In addition, the heat and wetting resistance was investigated in the Sample of the invention No. 1 in such manner that the heat-conductive rubber sheet was placed in the oven under the temperature of 80 degrees C and humidity of 95% until the fracture was observed. The result was shown in Table 2, in which days are shown when the fracture appeared.

In order to evaluate the total efficiency of the thermal conductivity of the heat-conductive rubber sheet and the thermal connection with the parts to be cooled or heat sink, the following effective thermal conductivity was calculated:

Effective thermal conductivity=thermal conductivity of the heat-conductive rubber sheet X adhesive rate The respective values of the effective thermal conductivity were also shown in Table 2.

[Sample of the invention No. 5, 6 and Sample for comparison No. 4]

The rubber and filler shown in Table 1 are kneaded by a kneader, and thus kneaded material is formed to a sheet by an open roll, and then a heating press is applied to the sheet by a heat press at the temperature of 160 degrees C for 30 minutes to prepare heat-conductive rubber sheets. Then, the thermal conductivity, hardness, adhesive rate, heat resistance were investigated for thus prepared heat-conductive rubber sheet, i.e., samples of the invention and the sample for comparison in the same manner as described in relation with Sample of the invention No. 1 to 4, and Sample for comparison No. 1 to 3. In addition, the heat and wetting resistance was investigated in the Sample of the invention No.5 in the same manner as in the Sample of the invention No. 1. The results including the effective thermal conductivity were shown in Table 2.

[Sample of the invention No. 7, 8]

The rubber and filler shown in Table 1 are kneaded by a kneader, and thus kneaded material is formed to a sheet by an open roll, and then a heating press is applied to the sheet by a heat press at the temperature of 120 degrees C for 10 minutes to prepare heat-conductive rubber sheets. Then, the thermal conductivity, hardness, adhesive rate, heat resistance were investigated for the prepared heat-conductive rubber sheet, i.e., samples of the invention and the sample for comparison in the same manner as described in relation with Sample of the invention No. 1 to 4, and Sample for comparison No. 1 to 3. In addition, the heat and wetting resistance was investigated. The results including the effective thermal conductivity were shown in Table 2.

[Sample for comparison No.5]

The sample for comparison No. 5 was prepared by mixing magnesium oxide particles into silicone rubber. The same evaluation as the above was carried out for the sample for comparison No. 5.

As is clear from Table 2, the effective thermal conductivity in all of the samples of the invention were higher than that in the samples for comparison, thus the heat-conductive rubber sheet of the invention is excellent in thermal conductivity. In general, the generated heat of the semiconductor device is about 5 W. However, the generating heat has a tendency to increase. Therefore, as a model calculation, it is considered a case in which the parts to be cooled (semiconductor device or the like) have the generating heat of 10 W which is double the usual generated heat of the semiconductor device. Then, the heat-conductive rubber sheet is interposed. Then, the following known formula is applied.

=(1/R)(t/A)

R=ΔT/Q wherein, R: heat resistance (degree C/W), ΔT: temperature difference (degree C), Q: heat generating (W), t: thickness (m) of the heat-conductive rubber sheet, A: area (m$^2$) of the heat-conductive rubber sheet.

Typical example of the size of the semiconductor device considered as the parts to be cooled is about 25 mm×25 mm (contact area is 6.25 ×10$^{-6}$ m$^2$). In order to control the temperature raise (ΔT) of the parts to be cooled under 5 degrees C, the value of ? becomes about 0.64 when the thickness of the heat-conductive rubber sheet is 0.2 mm. Therefore, it is required that the effective thermal conductivity is at least 0.6 in the above model calculation.

As described above, it is preferable that the practical heat-conductive rubber sheet has the effective thermal conductivity of at least 0.6 in the above model calculation. In this connection, all the samples of the invention No. 1 to 4 have the effective thermal conductivity of about 1.2. Thus, according to the model calculation, with the use of the samples of the invention, the temperature raise is controlled to under about 3 degrees C, even when the parts to be cooled generate heat of about 10 W.

The samples of the invention and the samples for comparison are explained in more detail.

In the samples of the invention No. 1 to 3, the magnesium oxide particles to be mixed are available under the product name PIROKISMA 5301 which is manufactured by Kyowa Kagaku Kogyo Co. Ltd.

In the samples of the invention No. 1 to 3, acrylic rubber is applied. The fracture was observed in the sample of the invention No. 1 at the temperature of 120 degrees C for evaluating heat resistance. However, no fracture was observed in the sample of the invention No. 1 at the temperature of 80 degrees C. The samples of the invention No. 1 to 3 are excellent in the effective thermal conductivity and hardness, thus, suitably used for cooling at relatively low temperatures.

Since magnesium silicate clay material containing water (the product name of EDOPURASU 70DS-NV manufactured by Mizusawa Kagaku Kogyo Co. Ltd) is further contained in the sample of the invention No. 2, the heat resistance of the heat-conductive rubber composition material was improved. The magnesium silicate clay material containing water has a fiber shaped crystal structure in which it seems that bricks are piled one after the other, thus having a large surface area. Since the magnesium silicate clay material containing water having the above structure is further mixed into the rubber, it is considered that the heat-conductive rubber composition material is further firmly combined to improve heat resistance.

On the other hand, since the aluminum particles are mixed in the sample for comparison No. 1, the sample has low thermal conductivity, thus the effective thermal conductivity thereof is also low. The amount of the mixed aluminum particles is increased in the sample for comparison No. 2. Although the thermal conductivity thereof becomes higher, the hardness thereof becomes higher and the adhesive rate is low. Thus, the effective thermal conductivity is also low in the sample for comparison No. 2. Certainly, since the adhesive rate is influenced by the hardness of the heat-conductive rubber sheet, it has a tendency that the hardness becomes higher, the adhesive rate becomes low accordingly.

Since the amount of the mixed hydrophobic magnesium particles is increased in the sample of the invention No. 3, the thermal conductivity and the effective thermal conductivity thereof becomes higher than that of the sample of the invention No. 1.

Butyl rubber is applied in the sample of the invention No. 4. The sample of the invention No. 4 has the higher thermal conductivity and the higher effective thermal conductivity as same as the samples of the invention No. 1 to 3.

On the other hand, since the sample for comparison No. 3 has a small amount of the hydrophobic magnesium oxide particles which is outside of the scope of the invention, the thermal conductivity is low, even though the hardness thereof is low, thus the effective thermal conductivity thereof is only 0.27 which is very low.

Ethylene propylene rubber is applied in the sample of the invention No. 5. Even though the hardness thereof becomes a little higher, the effective thermal conductivity thereof is 0.88 w/m·K which is relatively excellent.

On the other hand, since the sample for comparison No. 4 has a large amount of the hydrophobic magnesium oxide particles which is outside of the scope of the invention, the hardness thereof is too high so that the adhesive rate is too low, thus, the effective thermal conductivity becomes lower.

The product name of PIROKISMA 5301K manufactured by Kyowa Kagaku Kogyo Co. Ltd in which the hydration resistance is more improved than the above PIROKISMA 5301 is applied in the samples of the invention No. 6, 7. PIROKISMA 5301K is the hydrophobic magnesium particle in which a silane layer is formed on the surface of the PIROKISMA 5301.

No fracture was observed in the samples of the invention No. 6, 7 for a long time of more than 30 days in the test of the heat and wetting resistance. The fracture was observed in the samples of the invention No. 1, 5 after 15 days and 20 days passed respectively. Thus, it can be confirmed that both of the samples of the invention No. 6, 7 have a high heat and wetting resistance. Accordingly, it is preferable to use the magnesium oxide particles having the improved hydration resistance such as PIROKISMA 5301K or the like in case that the heat-conductive rubber sheet is used under a higher humidity and a higher temperature.

The sample of the invention No. 8 is the sample in which the organic compound having a lower melting point (i.e., MICRO WAX YH4D-1 in Table 1) is further contained in the sample of the invention No. 7. With the organic compound mixed thereinto, the heat-conductive rubber composition material having the adhesive rate of 80%. Furthermore, the effective thermal conductivity thereof is excellent in the sample of the invention No. 8.

The organic compound having a low melting point has the function to fill small rugged portions between the heat-conductive rubber sheet and the parts to be cooled, thus it is considered improving the adhesiveness. Although the example was carried out in the room temperature, when the heat-conductive rubber sheet of the sample of the invention No. 8 is applied, the organic compound is softened by the heat of the parts to be cooled in the interface with the parts to be cooled, it is further expected that small rugged portions between the heat-conductive rubber sheet and the parts to be cooled is filled, thus enabling to realize a further excellent effective thermal conductivity.

Since the magnesium oxide particles are mixed into the silicone rubber in the sample for comparison No. 5, the hardness is high and the adhesive rate deteriorates even though the thermal conductivity thereof is excellent, thus the effective thermal conductivity is low as 0.45.

Example 2

[Sample of the invention No. 9]

The rubber composition material of the sample of the invention No. 2 in Table 1 is dissolved by toluene, then the dissolved rubber composition material was coated on both surfaces of the aluminum foil having a thickness of 0.05 mm, then dried to prepare the heat-conductive rubber sheet having a thickness of 0.2 mm.

The thermal conductivity of the prepared heat-conductive rubber sheet was investigated by laser flush type thermal conductivity meter (manufactured by Shinku Riko Co. Ltd. The result showed that the heat-conductive rubber sheet had a very high thermal conductivity of 5.0 w/m·K. Furthermore, the adhesive rate which was investigated in the same manner as Example 1 was about 60%.

[Sample of the invention No. 10]

The rubber composition material of the sample of the invention No. 4 in Table 1 is dissolved by toluene, then the dissolved rubber composition material was coated on both surfaces of the aluminum foil having a thickness of 0.05 mm, then dried to prepare the heat-conductive rubber sheet having a thickness of 0.15 mm.

The thermal conductivity thereof was of 10 w/m·K, and the adhesive rate thereof was about 50%, the heat-conductive rubber sheet was excellent in both of them.

[Sample of the invention No. 11]

The rubber composition material of the sample of the invention No. 2 in Table 1 is dissolved by toluene, then the dissolved rubber composition material was coated on both surfaces of the copper foil having a thickness of 0.12 mm, then dried to prepare the heat-conductive rubber sheet having a thickness of 0.20 mm.

The thermal conductivity thereof was of 8 w/m·K, and the adhesive rate thereof was about 55%, thus the heat-conductive rubber sheet was excellent in both of them.

Example 3

[Sample of the invention No. 12]

The acrylic rubber adhesive agent (the product name of SK DINE 1358 manufactured by Soken Kagaku Co. Ltd.) is coated on both surfaces of the heat-conductive rubber sheet having, a thickness of 0.20 mm prepared as the sample of the invention No. 5 to prepare the heat-conductive rubber sheet having, a total thickness of 0.21 mm.

The thermal conductivity thereof was of 1.5 w/m·K, and the adhesive rate thereof was about 65%, thus the heat-conductive rubber sheet was excellent in both of them.

[Sample of the invention No.13]

The acrylic rubber adhesive agent (the product name of SK DINE 1358 manufactured by Soken Kagaku Co. Ltd.) is coated on both surfaces of the heat-conductive rubber sheet having, a thickness of 0.20 mm prepared as the sample of the invention No. 9 to prepare the heat-conductive rubber sheet having a total thickness of 0.21 mm.

The thermal conductivity thereof was of 5.0 w/m·K, and the adhesive rate thereof was about 70%, thus the heat-conductive rubber sheet was excellent in both of them.

Example 4

The heat-conductive sheet of the invention comprising the pure aluminum foil (purity of 99.99%) having a thickness of about 70$\mu$m as the soft metal sheet, and the heat-conductive rubber sheet in which the hydrophobic magnesium particles are mixed into the acrylic rubber having a thickness of about 30 $\mu$m as the rubber layer was prepared. For comparison, the heat-conductive sheet for comparison comprising the aluminum alloy foil having a thickness of about 70 $\mu$m in place of the soft metal sheet was prepared. Thus prepared heat-conductive sheet of the invention and the heat-conductive sheet for comparison was contacted with the parts to be cooled on the surface of which fine rough portions have the average height of about 5 $\mu$m and are spaced by 100$\mu$m each other to investigate the thermal connection.

Thus prepared heat-conductive sheet of the invention and the heat-conductive sheet for comparison was respectively contacted with the parts to be cooled (the contact surface thereof was 110 mm×127 mm) to investigate the thermal resistance, resulting in 0.0152 degree C/w for the heat-conductive sheet of the invention and 0.0093 degree C/w for the heat-conductive sheet for comparison. As is clear from the foregoing, the heat-conductive sheet of the invention was excellent in thermal connection. More specifically, since the heat-conductive sheet of the invention was excellent in thermal connection with the parts to be cooled, it can also be said that the heat-conductive sheet of the invention was excellent in thermal connection with the heat sink when it was contacted with the heat sink. Thus, according to the heat-conductive sheet of the invention, it is possible to realize the excellent thermal connection between the parts to be cooled and the heat sink.

As described in detail, the heat-conductive rubber composition material of the invention and the heat-conductive rubber sheet formed thereby are excellent in adhesiveness between the heat sink and the parts to be cooled such as semiconductor devices, and have higher thermal conductivity. Accordingly, a higher connection between the parts to be cooled and the heat sink is realized to provide more excellent cooling efficiency, thus practically excellent. Furthermore, the heat-conductive sheet of the invention has the excellent thermal connection with the electric parts and the heat sink, thus realizing excellent thermal connection between the electric parts and the heat sink.

What is claimed is:

1. A heat-conductive sheet, which comprises a rubber sheet essentially consisting of an acrylic rubber, a butyl rubber, an ethylene propylene rubber or a blended rubber which comprises at least two of said rubbers, and 50 to 85 weight % of hydrophobic magnesium oxide powder.

2. A heat-conductive sheet as claimed in claim 1, wherein said hydrophobic magnesium oxide comprises a magnesium oxide obtained by burning magnesium hydroxide having a high dispersion with an average particle size of up to 2 μm and 1 to 20 m$^2$/g of BET specific surface area at a temperature from 1100 to 1600 degree C, then grinding the burned magnesium oxide to have an average particle size of up to 20 μm.

3. A heat-conductive sheet as claimed in claim 2, wherein said rubber sheet further contains 1 to 10 weight % of magnesium silicate clay containing water.

4. A heat-conductive rubber sheet as claimed in claim 2, wherein said rubber sheet contains 2 to 20 weight % of organic compound having a melting point of from 40 to 90 degree C.

5. A heat-conductive sheet as claimed in claim 1, wherein an adhesive agent is coated on at least one surface of said sheet.

6. A heat-conductive sheet as claimed in claim 1, which comprises said rubber sheet and a soft metal sheet attached on at least one surface of said rubber sheet.

7. A heat-conductive sheet as claimed in claim 6, wherein said soft metal comprises a material having tensile strength of up to 100 N/mm$^2$.

8. A heat-conductive sheet as claimed in claim 6, wherein said soft metal comprises aluminum metal or copper metal.

9. A heat-conductive sheet as claimed in claim 6, wherein soft metal comprises pure aluminum metal having at least 99.99% of purity.

10. A heat-conductive sheet as claimed in claim 1, wherein the heat-conductive sheet is suitable for attachment on a heat-generating source in a computer part.

* * * * *

UNITED STATES PATENT AND TRADEMARK OFFICE
CERTIFICATE OF CORRECTION

PATENT NO.     : 6,338,898 B1
DATED          : January 15, 2002
INVENTOR(S)    : Toshio Miyahara et al.

It is certified that error appears in the above-identified patent and that said Letters Patent is hereby corrected as shown below:

<u>Column 9,</u>
Line 63, delete "ofthe" and insert therefor -- of the --

<u>Column 11,</u>
Line 43, after "Ltd." insert -- ). --

Signed and Sealed this

Twenty-second Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,338,898 B1                                    Page 1 of 1
DATED         : January 15, 2002
INVENTOR(S)   : Toshio Miyahara et al.

It is certified that error appears in the above-identified patent and that said Letters Patent is hereby corrected as shown below:

Column 9,
Line 63, delete "ofthe" and insert therefor -- of the --

Column 11,
Line 43, after "Ltd." insert -- ). --

Signed and Sealed this

Twenty-ninth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,338,898 B1  Page 1 of 1
DATED : January 15, 2002
INVENTOR(S) : Toshio Miyahara et al.

It is certified that error appears in the above-identified patent and that said Letters Patent is hereby corrected as shown below:

<u>Title page,</u>
Item [73], the Assignee should read -- The Furukawa Electric Co., Ltd. --

Signed and Sealed this

Twenty-ninth Day of April, 2003

JAMES E. ROGAN
*Director of the United States Patent and Trademark Office*